INVENTORS
Philip A. Lefrancois
Kenneth M. Barclay
James P. Van Hook

BY   JOHN C. QUINLAN
       ATTORNEY AND
     MARILYN J. MAUE
         AGENT 3,567,377
RECOVERY OF SULFUR VALUES FROM SULFUR-BEARING MATERIALS
Philip A. Lefrancois, Cranford, Kenneth M. Barclay, Stockton, and James P. Van Hook, Basking Ridge, N.J., assignors to Pullman Incorporated, Chicago, Ill.
Filed Aug. 12, 1968, Ser. No. 751,934
Int. Cl. C01b 17/16; C10g 19/08
U.S. Cl. 23—181                                          16 Claims

ABSTRACT OF THE DISCLOSURE

A process for the recovery of sulfur from normally solid or liquid carbonaceous material used in a process for producing synthesis gas in which the material is introduced into a carbonate melt of sodium, and/or potassium and the sulfur of the sulfur-containing material is converted to a sulfide. The melt is dissolved in an aqueous solution of the acid salt of the metal carbonate to recover the sulfide in aqueous solution and the solution is then carbonated with carbon dioxide in the presence of an aqueous solution more concentrated in metal bicarbonate than the aqueous solution entering the carbonation zone to produce hydrogen sulfide which can be converted to sulfur and to preceipitate the acid salt of the metal carbonate which is converted to the carbonate and recycled to the process as the alkali metal carbonate melt.

---

Figure 1:
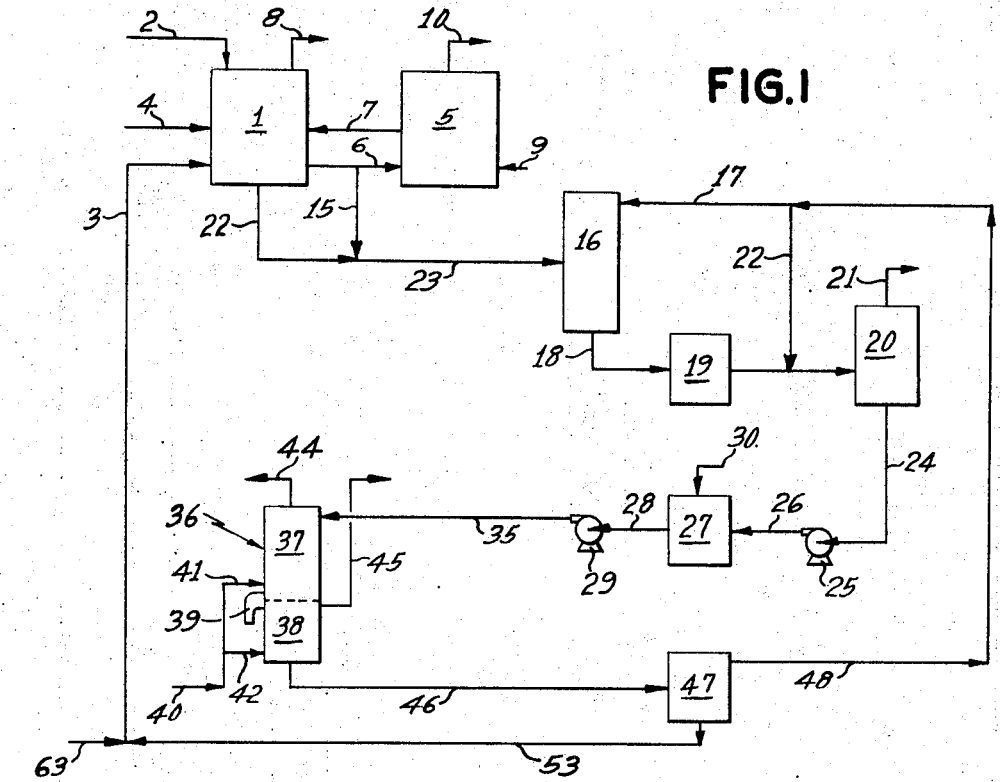

This invention pertains to the recovery of sulfur from normally solid or liquid sulfur-containing materials. In one aspect, this invention pertains to the recovery of sulfur from normally solid or liquid sulfur-bearing carbonaceous materials by a molten salt process either as a by-product or as the principal product of the process.

Many carbonaceous substances contain sulfur. Coal, for example, contains at least three types of sulfur compounds. Crude oil and its derivatives contain considerable quantities. Also, sulfur exists in comparatively large quantities in the form of inorganic sulfates and sulfides in solid non-carbonaceous materials, such as iron and copper ores. Generally, however, it has not been considered economically feasible to attempt sulfur recovery from such materials. Heretofore, there has existed no single method of sulfur extraction equally adaptable to a number of solid and liquid sulfur-containing materials.

In the process of coal gasification where coal containing metal sulfides, sulfates and sulfur bearing organic compounds is treated under high temperature with steam to release hydrogen-rich gases for synthesis reactions, it is also desirable to recover the sulfur values from the coal so as to obtain a purer product effluent.

Accordingly, it is the object of this invention to provide a method of recovering sulfur values from naturally occurring solid materials.

It is yet another object of this invention to provide a method of recovering sulfur values applicable to a larger number of normally solid and liquid sulfur-containing materials.

It is yet another object of this invention to provide a method of recovering sulfur values applicable to normally solid and liquid sulfur-containing carbonaceous materials.

It is still another object of this invention to provide a method of recovering sulfur values from sulfur-containing materials while simultaneously employing the method for a principal purpose other than the recovery of sulfur values.

These and other objects and advantages of this invention will become more apparent to those skilled in the art from the following description in conjunction with the attached drawings which illustrate some of the specific embodiments of the invention.

According to this invention, there is provided a method for the recovery of sulfur values from normally solid or liquid sulfur-bearing carbonaceous materials which comprises converting the combined or uncombined sulfur of the sulfur-bearing material to sulfide by contacting the material in the present of steam with a molten medium of predominantly an alkali metal carbonate of sodium, potassium or mixtures thereof, absorbing the sulfide in the molten medium under a pressure of between about 100 and about 2000 p.s.i.a., dissolving the resulting melt in an aqueous solution of the acid salt of the alkali metal carbonate, and liberating the sulfur from the solution as gaseous hydrogen sulfide as the produce of the process or further treating the gaseous hydrogen sulfide to produce elemental sulfur by any of the numerous processes known in the art, for example, by means of the Claus process which comprises generally oxidizing hydrogen sulfide with air to sulfur dioxide and reacting the sulfur dioxide with hydrogen sulfide to form elemental sulfur.

The sulfur-bearing carbonaceous materials of the present process can contain sulfur in any form including elemental sulfur and wide variety of sulfur compounds. Examples of solid sulfur-bearing materials which are suitably treated by this process include the various grades of coal such as anthracite, bituminous, brown coal, cannel coal, lignites, etc.; various types of coke, such as coal or petroleum coke, peat, graphite, charcoal, wood, wood waste products and non-woody plant materials, such as sugar and cellulose wastes and carbonaceous solids which are formed by coking during liquid hydrocarbon processing such as the processing of naphtha and reduced crude oils, etc. Also iron and copper ores which contain metal sulfates can be fed to the process for recovery of sulfur values.

Suitable sulfur-bearing materials which are normally liquid include hydrocarbons having atmospheric pressure boiling points of greater than 100° F. such as petroleum oils and fractions thereof, gas oils, asphalts, heptanes, cyclohexanes, naphtha fractions, kerosene, and mixtures thereof. Light and heavy oils and tars are also included as suitable sulfur-bearing materials.

The sulfur of the sulfur-bearing material can be in the elemental or combined state depending upon the nature of the sulfur-bearing material. The most common sulfur compounds contained in the solid sulfur-bearing material include the sulfides and sulfates of sodium, calcium and iron and organic sulfur compounds predominantly of the aromatic type. The liquid sulfur-bearing materials contain organic sulfur compounds such as sulfates, sulfonated compounds and sulfonic acids. Particularly prevalent in the coal sulfur-bearing materials are the aromatic sulfur compounds, iron sulfide, and metal sulfates. Sulfur compounds contained in, or derived from, the sulfur-bearing material are reduced by carbon and converted to the sulfide of the alkali metal.

The alkali metal salt which is employed in a molten state in the process of the present invention is the carbonate of sodium, potassium, or mixtures thereof and may contain other carbonates such as lithium carbonate to alter the properties of the melt for a particular application. The melt of the present process is used in excess with respect to the sulfur-bearing material introduced into the reaction zone. Generally, a weight ratio of between about 10:1 and about 50:1, preferably between 15:1 and 30:1 melt to sulfur-bearing material is employed in the conversion-absorption stage of the process.

The conversion and absorption of the sulfur from the sulfur-bearing material in the melt in the form of a metal sulfide takes place at a temperature between about 800° F. and about 2200° F. under a pressure of from about 100 p.s.i.a. to about 2000 p.s.i.a. Generally, a temperature of between about 1550° F. and about 2000° F. under from 200 p.s.i.a. to about 500 p.s.i.a. is preferred for this stage of the process.

In accordance with the present process the first reaction zone contains the molten carbonate medium which is contacted with the normally solid or liquid sulfur-bearing material and the primary function of the first reaction zone is to extract sulfur in the form of a metal sulfide in the carbonate melt. At least a portion of the sulfur of the sulfur-bearing material is in a form other than the sulfide, and this portion is converted to the sulfide of the alkali metal of the melt by decomposition and reduction reactions which occur in the melt. The first reaction zone can perform a number of functions in addition to absorption and conversion depending upon the nature of the sulfur-bearing material. For example, gasification of carbonaceous material to produce a hydrogen-rich synthesis gas can also occur simultaneously with sulfide absorption as in coal or heavy hydrocarbon conversion to synthesis gas. Specifically, in a gasification process, gasification of the sulfur-bearing carbonaceous material is carried out in the presence of steam wherein the steam:carbon mole ratio is maintained between about 1:1 and about 10:1; preferably between 1:1 and 2.5:1.

Various methods can be employed for contacting the melt and sulfur-bearing materials of the present process. For example, the liquid sulfur containing feed can be mixed with the melt by agitation or percolation with steam in the melt. Solids are preferably contacted with melt in a particulate size not larger than 6 mesh and are mechanically mixed and dispersed through the melt. After most of the sulfur has been taken up as sulfide in the molten metal carbonate, which may also contain solids from ash and non-combustible material, the melt is removed from the first reaction zone and quenched to a temperature between about 100° F. and about 600° F., preferably to a temperature of between 300° F. and 500° F. under a pressure corresponding to the reaction pressure. The quenching medium is the aqueous solution of the corresponding acid salt of the alkali metal carbonate having a salt concentration between about 6 and about 14 weight percent, preferably from 9 to 12 weight percent. The preferred acid salt solution is sodium bicarbonate corresponding to a sodium carbonate melt. While it is preferred to dilute the melt containing absorbed metal sulfide in the quenching zone with at least from 4 to 10 parts of aqueous solution per part of melt, dilutions of from 2 to 15 parts of aqueous solution per part of melt are also suitable.

When the resulting solution contains a troublesome amount of solid particles, the solids are separated by settling or preferably by passing through a filter. If desired, the solid particles can be reduced in size by grinding to less than 6 mesh subsequent to quenching. This reduction of particulate size facilitates the dissolution of the melt in the aqueous solution. In the case of synthesis gas formation from solid or liquid carbonaceous material, filters must be used to separate solids which form a slurry after quenching.

In order to reduce the liquid volume of material undergoing treatment and to further reduce temperature and pressure, the quenched material can be flashed to concentrate the solution in dissolved sulfide and carbonates. It is usually after the concentration by flashing, however, that the solid materials become troublesome and tend to form a slurry so that a filter is employed in order to provide a substantially clear aqueous solution of the absorbed metal sulfide and carbonate mixture.

The substantially clear solution is then passed to a multistage carbonation zone wherein a major portion of the alkali metal carbonate dissolved from the melt in the quenching zone is converted to bicarbonate precipitate in the first stage with carbon dioxide gas and wherein a major portion of the absorbed metal sulfide is converted to hydrogen sulfide in the second stage with carbon dioxide gas in double decomposition reaction.

In the carbonation zone the first stage of the reaction is maintained at a temperature between about 50° F. and about 150° F. under from about atmospheric to about 100 p.s.i.a., preferably between about 75° F. and about 125° F. under from about 15 p.s.i.a. to about 50 p.s.i.a. The second stage of the carbonation zone is maintained at a temperature and pressure similar to the first stage. The temperature can be controlled by the inlet temperature of the carbon dioxide and the volume of the gas employed or by positive cooling of the aqueous carbonate-bicarbonate mixture before introduction into the second stage carbonation zone where the metal sulfide is converted to hydrogen sulfide. Generally, a weight ratio of between about 0.1:1 and about 4:1, preferably between 0.2:1 and 1:1 carbon dioxide gas to solution from the first stage is maintained in the second stage carbonation zone.

In the second stage carbonation zone, the aqueous mixture containing the bicarbonate from the first stage provides better contact between the aqueous solution of sulfide and the carbon dioxide which is separately introduced into the second stage of carbonation. As a result, more complete and selective conversion of metal sulfide to hydrogen sulfide is realized. A gaseous mixture of hydrogen sulfide and carbon dioxide gas wherein the hydrogen sulfide is present in a concentration of at least 5 percent, preferably about 10 percent is removed from the second stage of the reaction as a gaseous effluent while the remaining aqueous solution from the first stage containing precipitated bicarbonate, is separately removed, filtered and at least a portion is dried and recycled to the gasification zone as the alkali metal carbonate for the molten medium. Any remaining bicarbonate solution can be used to supply dilution or quenching medium in the quenching zone of the process if desired.

The method of this invention will be more readily understood by reference to the following examples. It is to be understood that these examples are in no way limiting to the scope of the present invention but are presented merely to describe in detail certain embodiments of the process. Example 1 is illustrated by FIG. 1 of the drawings.

EXAMPLE 1

This example illustrates the recovery of sulfur as a by-product from a coal gasification process which employs a first stage gasification zone and a second stage combustion zone. Coal, the feed to the gasification zone, is combusted to supply heat to the melt. Sulfur enters the melt as residue from both the gasification and combustion reactions.

Bituminous coal of minus 12 mesh is fed to gasification zone 1. This coal has the following analysis:

|  | Weight percent |
|---|---|
| Water | 2.4 |
| Volatile matter | 39.0 |
| Fixed carbon | 53.5 |
| Ash | 5.1 |
| Carbon, total | 77.5 |
| Sulfur | 1.3 |

Coal is fed to zone 1 at the rate of 1,100 pounds per hour through conduit 2. The molten media within the reaction system is sodium carbonate. Sodium carbonate is fed to zone 1 from conduit 3 at the rate of 1250 pounds per hour, 1235 pounds of which is recycle and 15 pounds of which is fresh carbonate as explained hereinafter. Steam at the rate of 1000 pounds per hour and at a temperature of about 1000° F. is introduced into gasification zone 1 through conduit 4 which may exist as a separate line into zone 1 as shown, or which may be introduced along with the coal through conduit 2.

The molten melt in gasification zone 1 is maintained at about 1830° F. and at about 405 p.s.i.a. To supply the necessary heat to the melt, a portion of the melt is circulated through a combustion zone which may be integral with the gasification zone or separate therefrom, shown as zone 5. Melt is introduced into combustion zone 5 from gasification zone 1 through conduit 6 and returns from combustion zone 5 to gasification zone 1 through conduit 7.

A portion of that coal introduced into the melt through conduit 2 is oxidized in combustion zone 5 with air from conduit 9 at 415 p.s.i.a. and 1500° F. Only as much coal is oxidized within combustion zone 5 as is required to maintain a constant temperature in gasification zone 1. Generally, the temperature of the molten salt being returned to gasification zone 1 through conduit 7 will be about 1900° F. An overhead gas line 10 conducts the gaseous products of combustion from combustion zone 5 to further processing while overhead gas line 8 conducts the gaseous products from gasification zone 1 to subsequent processing.

In the present example, zones 1 and 5 are composed of a substantially pure fused and cast alumina having a dense microstructure. Such an alumina is Monofrax A composed of between about 94 and about 96 weight percent corundum and between about 3 and about 6 weight percent beta-alumina and having a density of about 220 pounds/cu. ft.; a Knoop hardness of about 2205; a thermal conductivty (2000° F. mean temperature) of about 49 B.t.u./ft.$^2$/in./° F./hr.; a linear expansion (2000° F. mean temperature) of about 0.88%; and a transverse strength of about 3855 p.s.i.

From conduits 6 and 15 and from line 22 a portion of the melt is withdrawn and is passed to quench tower 16 through line 23. The amount of molten melt withdrawn is beneficially that required to maintain a certain viscosity of the melt within the gasification-combustion system to compensate for the low viscosity of that material added through conduit 3. Under the preferred conditions at which melt will be withdrawn from the system, it will contain between about 5 and about 10 weight percent ash and between about 1 and about 4 weight percent sulfur. In the present instance, the rate of withdrawal is about 895 pounds per hour of which about 86–88 weight percent is melt, 8 to 10 weight percent is sulfur in the form of sulfide and ash and about 4 weight percent is uncombusted coke.

About 4,600 pounds per hour of an aqueous solution containing about 10 weight percent sodium bicarbonate and about 2 weight percent sodium carbonate is added through conduit 17 to quench tower 16. This material enters quench tower 16 at a temperature of about 100° F. and dissolves melt at a resulting solution temperature of about 445 F. under about 400 p.s.i.a.

In order to facilitate further dissolution of the melt, the resulting solution and solids are withdrawn from quench tower 16 through conduit 18 and passed to grinder 19 where size reduction of solids is effected. Some additional carbonate solution may be added thereafter through conduit 22 to further reduce the temperature of the solution-solids mixture so that the mixture enters holding tank 20 between about 150° F. and 250° F., in the present example, at about 210° F. and is flashed to a pressure of between about 14 and 50 p.s.i.a., in the present example, to a pressure of about 16 p.s.i.a.

From holding tank 20, between 30 and about 60 pounds per hour of gas is vented to the atmosphere through vent 21. The remaining solution-slurry is withdrawn from tank 20 through conduit 24 and pumped by means of pump 25 through conduit 26 to filter 27.

The feed rate to the filter is about 5,400 pounds per hour and consists of about 75 weight percent water, 23 weight percent carbonates, the balance being soluble sulfides, ash and carbon. The filter cake of filter 27 is washed with about 600 pounds per hour of water entering through conduit 30 and the wet filter cake of about 115 pounds per hour contains about 80 weight percent ash and coke and about 20 weight percent carbonate and water.

From filter 27, about 5900 pounds per hour of aqueous solution containing the sulfides are conveyed through conduit 28 to pump 29 from which the solution is pumped through conduit 35 into the top section of carbonation tower 36.

Carbonation tower 36 has an upper section 37 and a separate lower section 38 and the flow of solution between sections 37 and 38 is provided by any suitable means, for example, conduit 39.

Carbon dioxide is introduced into both sections 37 and 38 of carbonation tower 36 through common conduit 40, with conduit 41 introducing the carbon dioxide into section 37 and conduit 42 introducing the carbon dioxide into section 38.

In carbonation tower 36, the solution introduced into upper section 37 through conduit 35 passes downwardly contacting the carbon dioxide, introduced by conduit 41. The conditions in upper section 37 of tower 36 are controlled to a temperature of about 100° F. and atmospheric pressure to convert most of the sodium carbonate to the corresponding bicarbonate and to the point at which the carbon dioxide nearly or just begins to displace the metal sulfide from the solution as hydrogen sulfide. The carbonation tower can be operated at temperatures as low as room temperature or 68° F. and as high as 300° F. or higher if desired. In this example, during the course of the carbonation reaction of the sodium carbonate to form the bicarbonate, there is a small but continual evolution of hydrogen sulfide (less than 1 weight percent). Immediately prior to the point at which the carbon dioxide consumption begins to drop off and the hydrogen sulfide generation increases, the solution from carbonation tower section 37 is introduced via conduit 39 into carbonation tower section 38.

About 1900 pounds per hour carbon dioxide are introduced through conduit 41 into carbonation tower sections 37. Unused carbon dioxide in the amount of 1600 pounds per hour leaves section 37 through overhead conduit 44 and may be routed to recovery for recycling to the unit.

From carbonation tower section 37, 5800 pounds per hour of solution and sodium bicarbonate precipitate are withdrawn and introduced into the top of carbonation tower 38. Should the solution become too viscous for easy handling it may be desirable to separate at least a portion of the bicarbonate solids from the solution between sections 37 and 38. However, the presence of precipitate in the aqueous solution has a beneficial effect. The solution containing precipitate provides better contact between the carbon dioxide and the metal sulfide since the solid particles provide solution sites for entry of the carbon dioxide into solution.

The two stage carbonation of the present process increases the overall conversion and rate of reaction of metal sulfide to hydrogen sulfide. Because of the high basicity of the sodium carbonate solution entering the carbonation zone, the rate of carbon dioxide absorption is initially high. The alkalinity of the solution, however, is greatly reduced by conversion of the carbonate to the bicarbonate. Since it is the solution containing predominantly the bicarbonate which is introduced into the metal sulfide conversion zone (the second stage of the present carbonation process), improved contact between the carbon dioxide and metal sulfide is realized. The reduced alkalinity of the solution also aids in the separation of hydrogen sulfide product from the reaction mixture since the hydrogen sulfide is less readily absorbed by the less basic solution and is therefore easily separated as a gas in admixture with excess carbon dioxide.

To the 5800 pounds of slurry-containing metal sulfides introduced into section 38, is added through conduit 42, 125 pounds per hour of carbon dioxide. In this less alkaline medium, carbon dioxide reacts with the metal sulfides and hydrogen sulfide product is liberated from the solution in which some formation of additional bicarbonate has taken place. The amount of carbon dioxide introduced into section 38 is such as to give a concentration of hydrogen sulfide in carbon dioxide, withdrawn as gaseous effluent through conduit 45, of about 5 to about 50 percent, preferably above about 10 percent. At a concentration level within this range the carbon dioxide-hydrogen sulfide mixture is most suitable for further processing for example, processing in the Claus process, to convert the hydrogen sulfide to sulfur.

The bicarbonate slurry at a rate of about 5800 pounds per hour is withdrawn from bottom section 38 through conduit 46 and, if a filtration step has been employed between stages, the slurry can be combined with that bicarbonate separated from the slurry entering tower section 38. The slurry withdrawn is filtered in filter 47 and the filter cake of about 1200 pounds per hour, comprising about 98 weight percent bicarbonate and 2 weight percent ash is dried and, after conversion of the sodium bicarbonate to sodium carbonate, is recycled to the process through conduit 53 at the aforestated rate of about 1235 pounds per hour. Sodium carbonate make-up as needed, in this example at the rate of about 15 pounds per hour, is introduced into the treating zone for carbonaceous material through conduit 63.

Bicarbonate solution from filter 47 is routed through conduit 48, and is introduced into the quenching zone through conduits 17 and 22, as previously described.

About 15 pounds per hour of hydrogen sulfide in a gaseous mixture with about 75 pounds per hour carbon dioxide is recovered in the present example.

Additional sulfur can be recovered when the above process is modified by adding to the molten salt a sulfate such as sodium or calcium, or a portion of iron or copper ore, the sulfur of which is recovered with that existing in the coal. For example, a quantity of sulfate, for example, sodium sulfate, in an amount of up to about 10 or 15 percent of the fresh carbonaceous feed can be introduced to the molten salt. The sulfur recovery in this case will be that total amount, less process losses, from the sulfate and from the coal. The melt withdrawn to quench contains sulfur in the form of sodium sulfide. The sulfur is recovered as hydrogen sulfide with the sodium being recovered as the bicarbonate or carbonate which is recycled to the system as melt and which compensates for melt compound losses from the system.

Calcium sulfate can also be added to the system. In this case, the sulfur is recovered as previously described, while the calcium is discharged from the process principally as the carbonate and is found in the ash.

EXAMPLE 2

Figure 2:
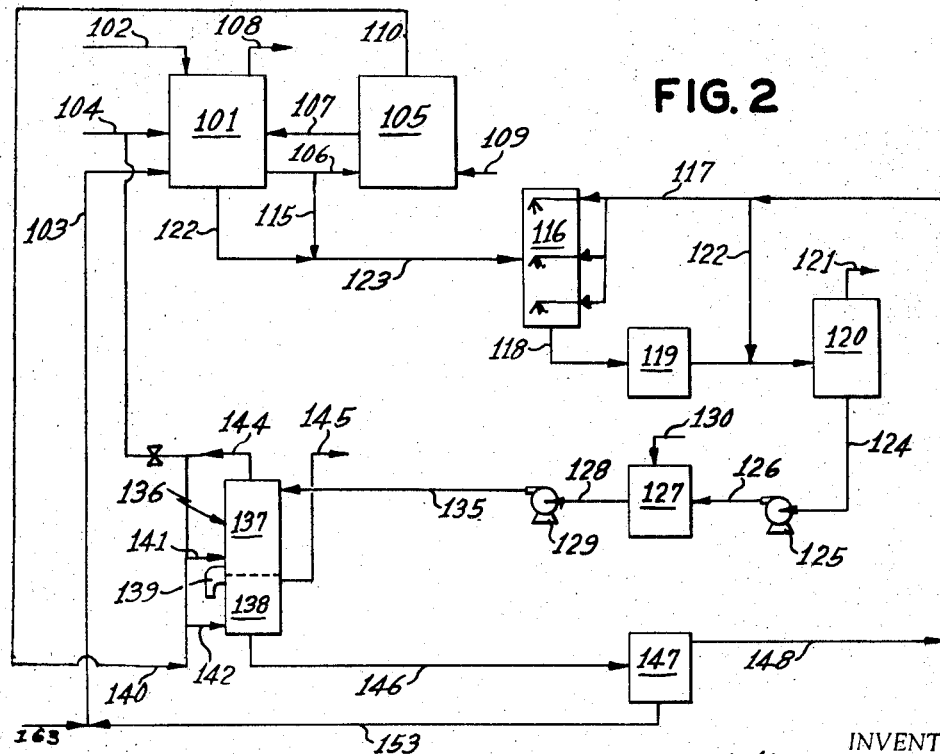

This example, based on FIG. 2, illustrates the recovery of sulfur directly from a sulfate such as the sodium sulfate by-product from a process from the manufacture of hydrogen chloride from sodium chloride. The process employs a molten salt reaction media, in which are established two reaction zones, a first reaction zone in which the sulfate feed to the process is converted to the sulfide and a second reaction zone where an exothermic oxidation of a carbonaceous material such as coal, coke, wood, and hydrogen provides heat to the process.

Bituminous coal of minus 12 mesh, having the analysis of that of Example 1, is fed to the reaction zone 101 in the amount of 70 pounds per hour through conduit 102 along with 142 pounds per hour of sodium sulfate. The media forming the molten reaction media is sodium carbonate, 690 pounds per hour of which are fed to zone 101 through conduit 103. About 14 atmospheres of carbon dioxide is also introduced into reaction zone 101 by means of conduit 104 to prevent corrosion and to provide agitation in the reaction zone.

The molten melt in zone 101 is maintained at about 1880° F. and about 405 p.s.i.a. under which conditions the free carbon in the melt, represented by about 1 weight percent coal in the mix, provides the proper conditions for the reduction of the sulfate to the corresponding sulfide.

The melt is circulated between reaction zone 101 and oxidazation zone 105. An oxygen-containing gas, preferably air is introduced into zone 105 through conduit 109. Some of this air oxidizes the coal in the melt while a portion oxidizes that carbon monoxide formed in reaction zone 101 upon the reduction of the sulfate. The oxides of carbon from zones 101 and 105 are taken overhead through conduits 108 and 110, respectively, after which a portion may be recycled for agitation purposes or may be treated for recovery of the carbon dioxide required in the carbonation of the solutions as hereinafter discussed.

Oxidation zone 105 is held at a temperature of about 1950° F. and about 415 p.s.i.a. and the heat imparted to the melt in zone 105 facilitates maintaining the salt in its molten state. Molten melt is returned from oxidation zone 105 to reaction zone 101 through conduit 107.

A portion of melt is withdrawn from zone 101 by means of conduits 122 and 115 and introduced to conduit 123 and into quench tower 116. The quantity so introduced into the quench tower amounts to about 780 pounds per hour, of which about 88 weight percent is melt, about 10 weight percent is sodium sulfide and about 2 weight percent is ash and carbonaceous feed.

About 4000 pounds per hour of an aqueous solution containing about 9–12 percent is sprayed through nozzles into quench tower 116 from lines 117 and 119. This solution enters quench tower 116 at a temperature of about 100° F. and cools and quenches the melt to a solution temperature of about 445° F. at about 400 p.s.i.a. while agitating the melt mixture to prevent the formation of large solid particles.

In order to facilitate further dissolution and cooling of the melt, solution and solids are withdrawn from quench tower 116 through conduit 118 and passed to flashing zone 120. Some additional sodium carbonate solution may be added to the solution entering zone 120 from conduit 122. The temperature of the solution solid mixture is reduced in zone 120 to about 210° F., by flashing to a pressure of about 16 p.s.i.a.

Inert gas is vented from the top of zone 120 and from the process through conduit 121. A solution-slurry is withdrawn from zone 120, passed through conduit 124 and pumped by pump 125 through conduit 126 to filter 127.

The feed rate to filter 127 is about 4700 pounds per hour and consists of about 83 weight percent water, 15 weight percent carbonates, 1.6 weight percent sodium sulfide, the balance being ash and carbon. The wet filter cake from filter 127 is washed with 50 pounds per hour of water introduced through line 130 and about 11 pounds per hour of carbon and coal ash is rejected from the filter zone. About 4740 pounds per hour of filtered aqueous solution are conveyed through conduit 128 to pump 129 from which the solution is pumped through conduit 135 and into carbonation tower 136.

Carbonation tower 136 is preferably the dual-section tower described above having a corresponding upper section 137 in which the conversion of sodium carbonate to sodium bicarbonate is conducted and a corresponding lower section 138 in which the conversion of sodium sulfide to hydrogen sulfide is carried out. Flow of solution between sections 137 and 138 is provided by any suitable means, for example, conduit 139 and the same advantages of Example 1 are obtained in the present example.

Carbon dioxide is introduced into both sections 137 and 138 of carbonation tower 136 through common conduit 140, with conduit 141 introducing the carbon dioxide into section 137 and conduit 142 introducing the carbon dioxide into section 138.

In carbonation tower 136, the solution introduced into upper section 137 through conduit 135 passes downward counter-currently to, and in contact with, the carbon dioxide introduced by conduit 141. Conditions in the upper section 137 to tower 136 are controlled to convert most of the carbonate to the bicarbonate and to a point at which the carbon dioxide just begins to displace the sulfide from the solution as hydrogen sulfide. At or about this point, the solution from carbonation tower section 137 is introduced via conduit 139 into carbonation tower section 138.

About 1520 pounds per hour of carbon dioxide are introduced through conduit 141 into carbonation tower sections 137. Carbon dioxide leaves section 137 at the rate of 1280 pounds per hour through conduit 144 and may be routed to recovery for recycling to the unit.

From carbonation tower section 137, 4,640 pounds per hour of solution and sodium bicarbonate precipitate are withdrawn and introduced into the top of carbonation tower section 138. About 4,640 pounds per hour of solution, including the sulfides, 225 pounds per hour of carbon dioxide are introduced into section 138 through conduits 139 and 142. Completion of the bicarbonate precipitation takes place, and hydrogen sulfide is liberated from solution in a gaseous effluent containing about 34 pounds per hour of hydrogen sulfide in 136 pounds per hour of carbon dioxide.

The bicarbonate slurry withdrawn from bottom section 138 through conduit 146 is filtered in filter 147 and after being washed with water, the filter cake of about 800 pounds per hour, consisting of about 99 weight percent sodium bicarbonate is dried and recycled to the process through conduit 153, after conversion of the sodium bicarbonate to sodium carbonate. Make-up sodium carbonate in the amount of about 100 pounds per hour is added to the system through conduit 163.

Bicarbonate solution from filter 147 is routed through conduit 148, and introduced into the quenching zone through conduit 117 as previously described.

Sulfur values, as previously mentioned, may be recovered by means of the process disclosed herein from a large number of salts. It is only necessary that the sulfur be introduced into the process in a form in which it can be reduced to a soluble sulfide form in the molten reaction mixture after which it is dissolved in a solvent from which its displacement, preferably as a gaseous sulfide, can be effected. For example, in the case where calcium sulfate is used as the material from which it is desired to recover sulfur values, a soluble sodium sulfide is formed by reduction in the melt, and the sulfur is recovered as the gaseous hydrogen sulfide from the carbonation step in a gas stream with carbon dioxide. The calcium precipitates as the insoluble carbonate and is separated from the process.

Having thus described our invention, we claim:

1. A process for recovering sulfur values from normally solid and liquid sulfur-bearing carbonaceous materials which comprises:
   (a) converting combined or uncombined sulfur of the sulfur-bearing material to alkali metal sulfide in a reaction zone by contacting said material, in the presence of a reducing gas, with a molten medium essentially comprised of an alkali metal carbonate of sodium, potassium or mixtures thereof, at a temperature between 800° F. and 2200° F.;
   (b) absorbing the metal sulfide in the molten medium under a pressure of from about 100 p.s.i.a. to about 2,000 p.s.i.a.;
   (c) mixing the molten medium containing absorbed alkali metal sulfide with an aqueous solution of the acid salt of the alkali metal carbonate wherein the concentration of the acid salt in solution is maintained between 6 and 14 weight percent;
   (d) dissolving at least a portion of the molten medium in the aqueous acid salt solution which is employed in a ratio of between about 2 and about 15 parts solution per part of melt containing absorbed alkali metal sulfide, to form an acid salt solution mixture;
   (e) passing the resulting acid salt solution mixture to a filtering zone and removing solids therein; and
   (f) reacting the filtered acid salt solution with carbon dioxide at a temperature between about 50° F. and about 150° F. under a pressure from about atmospheric to about 100 p.s.i.a. in a carbonation zone to form hydrogen sulfide as a gaseous product of the reaction.

2. The process of claim 1 wherein the hydrogen sulfide is reacted with oxygen to recover elemental sulfur.

3. A process for recovering sulfur values from normally solid and liquid sulfur-bearing carbonaceous materials which comprises:
   (a) converting combined or uncombined sulfur of the sulfur-bearing material to alkali metal sulfide in a reaction zone by contacting said material, in the presence of a reducing gas, with a molten medium essentially comprised of an alkali metal carbonate of sodium, potassium or mixtures thereof, at a temperature between 800° F. and 2200° F.;
   (b) absorbing the metal sulfide in the molten medium under a pressure of from about 100 p.s.i.a. to about 2,000 p.s.i.a.;
   (c) mixing the molten medium containing absorbed alkali metal sulfide with an aqueous solution of the acid salt of the alkali metal carbonate wherein the concentration of the acid salt in solution is maintained between 6 and 14 weight percent;
   (d) dissolving at least a portion of the molten medium in the aqueous acid salt solution which is employed in a ratio of between about 2 and about 15 parts solution per part of melt containing absorbed alkali metal sulfide, to form an acid salt solution mixture containing the alkali metal sulfide, the alkali metal carbonate and the acid salt of the alkali metal carbonate;
   (e) passing the resulting acid salt solution mixture to a filtering zone and removing solids therein;
   (f) passing the filtered acid salt solution substantially free of solids to the first stage carbonation zone of a two stage carbonation and contacting the filtered acid salt solution with carbon dioxide at a temperature between about 50° F. and 150° F. under atmospheric to 100 p.s.i.a. pressure to convert at least a major portion of the alkali metal carbonate to the corresponding bicarbonate and to obtain a less alkaline solution;
   (g) withdrawing the solution of reduced alkalinity from the first stage carbonation zone before a substantial quantity of hydrogen sulfide gas is formed and passing said solution containing at least a portion of the bicarbonate to the separate second stage carbonation zone of the two stage carbonation;
   (h) in the second stage carbonation zone, contacting the solution of reduced alkalinity with carbon dioxide to convert at least a major portion of the alkali metal sulfide to hydrogen sulfide; and
   (i) recovering the hydrogen sulfide as a gaseous product of the process.

4. The process of claim 3 wherein the aqueous solution mixture of the acid salt is a solution containing from about 4 to about 14 weight percent alkali metal bicarbonate.

5. The process of claim 3 wherein solution obtained from dissolving melt in the aqueous acid salt solution contains solids and the solids are ground to reduce the particle size and to promote dissolution prior to filtration.

6. The process of claim 5 wherein the particles of the solution are ground to a size less than 6 mesh.

7. The process of claim 3 wherein the aqueous acid salt solution is sprayed at a high velocity into the melt to prevent formation of large particles in the resulting solution.

8. The process of claim 3 wherein the solution obtained from dissolving melt in the aqueous acid salt solution is cooled by further dilution to a temperature between about 150 and about 250° F. and the dilute solution is flashed to a pressure of between about 14 p.s.i.a. and about 50 p.s.i.a. prior to filtration.

9. The process of claim 3 wherein carbon dioxide is passed to the second stage carbonation zone in a weight ratio of between about 0.1:1 and 4:1 carbon dioxide to solution.

10. The process of claim 3 wherein the bicarbonate formed in the carbonation zone is solid precipitate and a portion of this precipitate is removed from the solution and withdrawn from the first carbonation zone before introducing the solution into the second carbonation zone.

11. The process of claim 3 wherein carbon dioxide gas is withdrawn from the reaction zone and is employed to supply feed to the carbonation zone 12. The process of claim 3 wherein carbon dioxide is removed from the first stage carbonation zone and is passed to the reaction zone to prevent corrosion therein.

13. The process of claim 3 wherein hydrogen sulfide in admixture with carbon dioxide is withdrawn from the second stage carbonation zone, the carbon dioxide is separated from the hydrogen sulfide and is recirculated to the second stage carbonation zone.

14. The process of claim 3 wherein hydrogen sulfide is withdrawn from the second stage carbonation zone in admixture with carbon dioxide, the carbon dioxide is separated from the hydrogen sulfide and is used to supply carbon dioxide gas to the reaction zone.

15. The process of claim 3 wherein alkali metal bicarbonate in liquid solution is withdrawn from the second stage carbonation zone and a portion is converted to alkali metal carbonate and returned to the reaction zone as the molten medium.

16. The process of claim 15 wherein a portion of the alkali metal bicarbonate in liquid solution is withdrawn from the second stage carbonation zone, is diluted with water, and is passed to the zone where the melt is dissolved in the aqueous solution of the acid salt.

References Cited

UNITED STATES PATENTS

| | | | |
|---|---|---|---|
| 1,651,492 | 12/1927 | Walter | 23—138X |
| 1,938,672 | 12/1933 | Ruthruff | 208—230 |
| 2,094,070 | 9/1937 | Hultman et al. | 23—181 |
| 2,496,550 | 2/1950 | Larsson et al. | 23—64 |
| 2,675,297 | 4/1954 | Gray et al. | 23—64X |
| 2,849,292 | 8/1958 | Shick | 23—134 |
| 2,993,753 | 7/1961 | Collins, Jr. | 23—48 |
| 3,166,483 | 1/1965 | Masciantonio | 23—209.9 |
| 3,387,941 | 6/1968 | Murphy et al. | 208—230 |
| 3,402,998 | 9/1968 | Squires | 23—225X |

OSCAR R. VERTIZ, Primary Examiner

G. O. PETERS, Assistant Examiner

U.S. Cl. X.R.

23—224; 208—235

PO-1050
(5/69)

UNITED STATES PATENT OFFICE
CERTIFICATE OF CORRECTION

Patent No. 3,567,377          Dated    March 2, 1971

Inventor(s) Kenneth M. Barclay, Philip A. LeFrancois and James P.Van

It is certified that error appears in the above-identified patent and that said Letters Patent are hereby corrected as shown below:

Column 1, line 6, after "assignors" insert
--one undivided half interest--; line 6, after "Chicago, Ill."
after the period (.) insert a comma (,) after which insert
--one undivided half interest to Department of the Interior,
Government of the United States of America.--

Signed and sealed this 12th day of October 1971.

(SEAL)
Attest:

EDWARD M.FLETCHER,JR.          ROBERT GOTTSCHALK
Attesting Officer               Acting Commissioner of Patents